US011932006B2

(12) United States Patent
Aoki et al.

(10) Patent No.: US 11,932,006 B2
(45) Date of Patent: Mar. 19, 2024

(54) RECORDING DEVICE, INFORMATION PROCESSING SYSTEM

(71) Applicant: Seiko Epson Corporation, Tokyo (JP)

(72) Inventors: Hiroki Aoki, Nagano (JP); Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/503,497

(22) Filed: Oct. 18, 2021

(65) Prior Publication Data

US 2022/0118775 A1 Apr. 21, 2022

(30) Foreign Application Priority Data

Oct. 20, 2020 (JP) ................................ 2020-175884

(51) Int. Cl.
*B41J 11/00* (2006.01)

(52) U.S. Cl.
CPC .......... *B41J 11/007* (2013.01); *B41J 11/0005* (2013.01); *B41J 11/0085* (2013.01)

(58) Field of Classification Search
CPC ... B41J 11/007; B41J 11/0005; B41J 11/0085; B41J 15/04; B41J 11/0015; B41J 11/009
See application file for complete search history.

(56) References Cited

U.S. PATENT DOCUMENTS

2006/0222394 A1* 10/2006 Koshida ............... G03G 15/657 399/68
2012/0235929 A1* 9/2012 Hongo ..................... B65H 7/06 271/265.04
2016/0223974 A1 8/2016 Shida et al.
2017/0032301 A1* 2/2017 Marshall .......... G06Q 10/06313
2017/0045853 A1 2/2017 Hiratsuka et al.
2020/0247160 A1* 8/2020 Yamazaki ........... G01S 7/52006

FOREIGN PATENT DOCUMENTS

JP 2016-008102 1/2016
JP 2016-139075 8/2016

OTHER PUBLICATIONS

Kakimoto Shoji, Printer, Feb. 8, 2016, Japan, All Pages (Year: 2016).*
La Vos Peter, G, Method for Transferring a Sheet Between Two Conveyors, Jun. 1, 2016, Europe, All Pages ( Year: 2016).*
Takai, Tsutomu, Image Forming Apparatus, Jan. 23, 2020, Japan, All Pages (Year: 2020).*
Taga, Shinichiro, Wrinkle Detector and Image Forming Apparatus, Mar. 30, 2006, Japan, All pages (Year: 2006).*
Chike, Kohei, Coating Applicator, Image Forming Device and Image Forming System, Aug. 29, 2019, Japan, All Pages (Year: 2019).*

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

A recording device includes: a transport unit configured to transport a medium along a transport path, a recording unit configured to perform recording on the medium transported, a wrinkle forming mechanism configured to form wrinkles on a portion of the medium on the transport path before recording is performed, a detection unit configured to detect a state of the wrinkles, and a control unit, wherein the control unit is configured to calculate a rigidity characteristic of the medium based on detection data of the detection unit.

9 Claims, 12 Drawing Sheets

RECORDING DEVICE, INFORMATION PROCESSING SYSTEM

The present application is based on, and claims priority from JP Application Serial Number 2020-175884 filed Oct. 20, 2020, the disclosure of which is hereby incorporated by reference herein in its entirety.

BACKGROUND

1. Technical Field

The present disclosure relates to a recording device, and an information processing system.

2. Related Art

Conventionally, as disclosed in JP-A-2016-8102, there has been known a sheet feeding device that includes: a suction member for sucking a sheet, and a sheet thickness detection unit for detecting a thickness of the sheet as a rigidity detection unit for detecting rigidity of a sheet, wherein the suction member is adjusted based on information of the thickness of the sheet.

However, in the above-described device, the thickness of the sheet is used for determining the rigidity of the sheet. However, for example, even when sheets have the same thickness, the sheets may have different stiffnesses depending on types of sheets. Accordingly, there is a drawback that the rigidity of the sheet cannot be detected sufficiently.

If the rigidity of the sheet is not taken into account appropriately, a transport trouble such as jamming occurs on a transport path.

SUMMARY

A recording device includes: a transport unit configured to transport a medium along a transport path, a recording unit configured to perform recording on the medium transported, a wrinkle forming mechanism configured to form a wrinkle at a portion of the medium on the transport path before recording is performed, a detection unit configured to detect a state of the wrinkle, and a control unit, wherein the control unit is configured to calculate a rigidity characteristic of the medium based on detection data of the detection unit.

An information processing system is an information processing system configured to enable communication between a recording device and a maintenance service providing unit, wherein the recording device includes: a transport unit configured to transport a medium along a transport path, a recording unit configured to perform recording on the medium transported, a wrinkle forming mechanism configured to form a wrinkle at a portion of the medium on the transport path, a detection unit configured to detect a state of the portion of the medium where the wrinkle is formed, a first communication unit configured to communicate with the maintenance service providing unit, and a first control unit, wherein the first control unit is configured to transmit detection data detected by the detection unit to the maintenance service providing unit, the maintenance service providing unit includes: a second communication unit configured to communicate with the recording device, a storage unit in which a data table where a printing parameter is associated with rigidity characteristics is stored, and a second control unit, and the second control unit is configured to calculate the rigidity characteristic of the medium based on the received detection data, to derive the printing parameter corresponding to the calculated rigidity characteristic, and to transmit the derived printing parameter to the recording device.

DESCRIPTION OF EXEMPLARY EMBODIMENTS

1. First Embodiment

First, a configuration of a recording device 11 is described.

Figure 1:
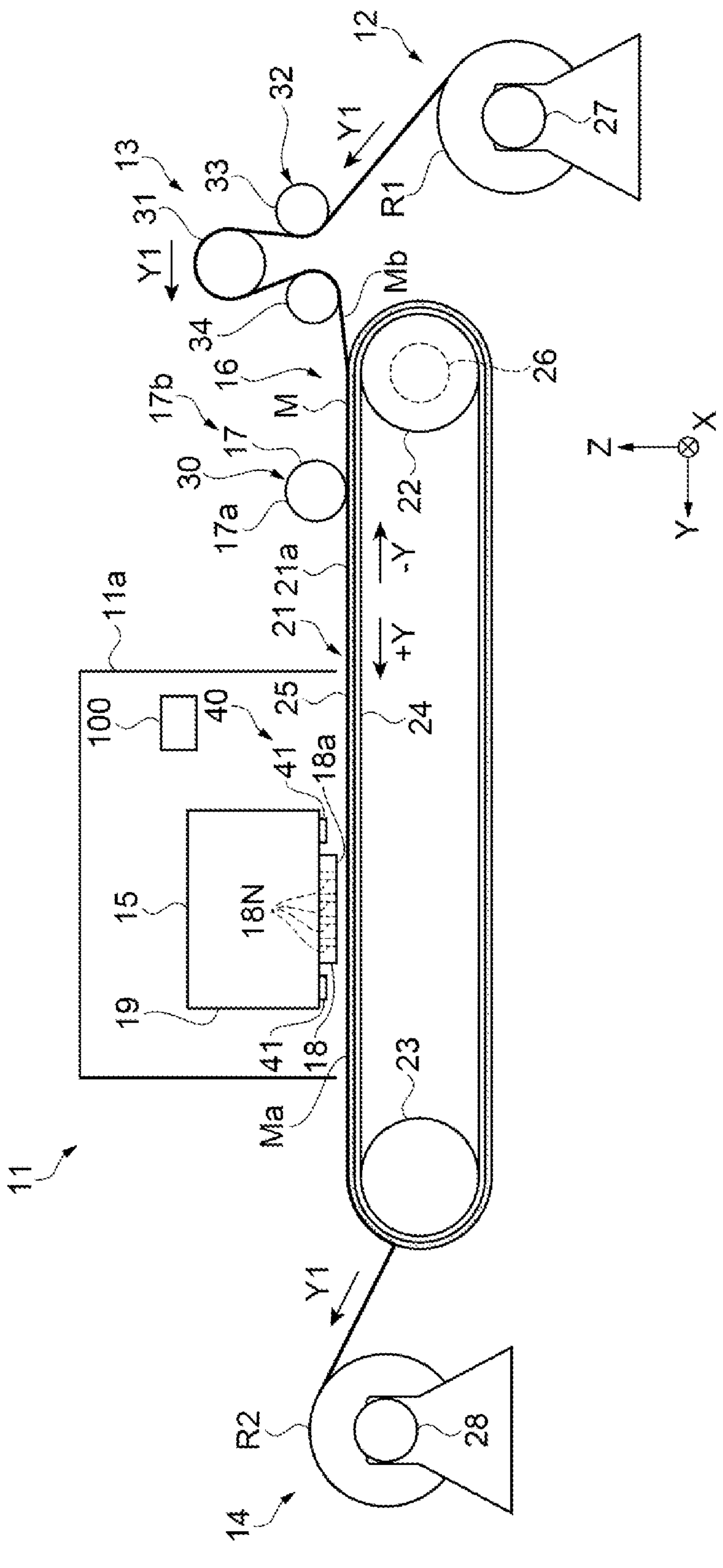
FIG. 1 is a schematic view illustrating a configuration of a recording device according to a first embodiment.

As illustrated in FIG. 1, the recording device 11 of the present embodiment is an ink jet-type printer configured to record an image such as a character or a photograph by ejecting ink, that is an example of a liquid, to a media M (medium) such as a fabric, a film sheet, or a paper sheet, for example. The recording device 11 includes a holding unit 12, a tension unit 13, a peeling device 14, a recording unit 15, a transporting unit 16 as an example of a transport unit, and a pressing unit 17.

The holding unit 12 is configured to hold a first roll body R1 where the media M is wound. The transporting unit 16 is configured to transport the media M fed from the first roll body R1. The recording unit 15 is configured to record in the media M.

The media M is transported in a transport direction Y1 along a transport path from the first roll body R1 held by the holding unit 12 to a second roll body R2 where the media M peeled off from the transporting unit 16 by the peeling device 14 is wound. The transport direction Y1 is a direction that changes corresponding to a transport position of the media M on the transport path. A belt transport direction +Y, that is the transport direction of the media M transported by the transporting unit 16, is one of the transport direction Y1.

Here, the media M is movable in the belt transport direction +Y and a reverse belt transport direction −Y opposite to the belt transport direction +Y. The transport direction Y1 is the transport direction in a case where a recording operation is performed on the media M by the recording unit 15, and the reverse belt transport direction −Y is the transport direction in a case where an adjusting operation of adjusting a media position when the media M is set to the transporting unit 16 is performed, for example.

A housing 11*a* is disposed above a transporting belt 21. The recording unit 15 and a control unit 100 are housed in the housing 11*a*. The recording unit 15 records in the media M by ejecting a liquid to the media M, for example. The recording unit 15 includes a recording head 18, and a carriage 19 that holds the recording head 18. The recording head 18 includes nozzles 18N that eject droplets, and a nozzle surface 18*a* at which the nozzles 18N open. The nozzle surface 18*a* faces a support surface 21*a* of the transporting belt 21 with a predetermined gap therebetween. An image is recorded on the media M since droplets ejected from the nozzles 18N land on a surface Ma of the media M stuck to the support surface 21*a*.

The recording unit 15 may be a serial head that scans with respect to the media M, or may be a line head that extends over substantially the same range as a width of the media M. In a case where the recording unit 15 is a serial head, the carriage 19 moves in a scanning direction parallel to a width direction that is a direction along an X axis. The recording head 18 ejects droplets from the nozzles 18N to record an image on the media M in the course of the movement of the carriage 19 in the scanning direction. In a case where the recording unit 15 is a line head, an image is recorded on the media M by ejecting droplets at a time toward the media M transported at a constant speed from the plurality of nozzles 18N arranged within the range substantially equal to the width of the media M.

The transporting unit 16 includes the transporting belt 21, a driving roller 22, and a driven roller 23. The transporting belt 21 is wound around the driving roller 22 and the driven roller 23. The transporting belt 21 includes an endless base material 24 and an adhesive layer 25 disposed on an outer peripheral surface of the base material 24. The adhesive layer 25 is formed by applying an adhesive agent to the whole circumference of the outer peripheral surface of the base material 24. That is, the transporting belt 21 is a glue belt having the adhesive layer 25. The transporting belt 21 has the support surface 21*a*, for supporting the media M, on a surface of the adhesive layer 25. The media M is supported on the support surface 21*a* in a state where the media M is stuck to the surface of the adhesive layer 25.

The transporting unit 16 includes a transport motor 26 as a drive source. The driving roller 22 is coupled to the transport motor 26 such that the transport motor 26 can transmit power to the driving roller 22. When the transport motor 26 is driven, the driving roller 22 rotates. When the driving roller 22 rotates, the transporting belt 21 circulates. The driven roller 23 rotates following the circulation of the transporting belt 21. In this manner, the transport motor 26 transmits driving force to the driving roller 22 to drive the transporting belt 21. By circulating the transporting belt 21, the media M stuck to the support surface 21*a* is transported. The driving roller 22 and the driven roller 23 may be reversed in position, and a roller on a downstream side in the belt transport direction +Y may be used as the driving roller 22.

The pressing unit 17 is disposed above the support surface 21*a* of the transporting belt 21 so as to face the support surface 21*a* at a position on an upstream side of the recording unit 15 in the belt transport direction +Y.

The pressing unit 17 presses the media M against the transporting belt 21. Accordingly, the media M is stuck to the adhesive layer 25. The pressing unit 17 sequentially sticks the media M to the adhesive layer 25 along with the circulation of the transporting belt 21. The media M is supported in a state where the media M is stuck to the support surface 21*a* of the transporting belt 21.

The pressing unit 17 includes a pressurizing roller 17*a* that is brought into contact with the surface Ma of the media M and pressurizes the media M. The pressing unit 17 includes a moving mechanism 17*b* that moves the pressurizing roller 17*a* along the support surface 21*a* of the transporting belt 21 in a reciprocating manner. The pressing unit 17 sticks a back surface Mb of the media M to the adhesive layer 25 with certainty by moving the pressurizing roller 17*a* in a reciprocating manner between in the belt transport direction +Y and in a reverse belt transport direction −Y by the moving mechanism 17*b* while making the pressurizing roller 17*a* apply a pressure to the media M. The pressurizing roller 17*a* may move in a width direction in a reciprocating manner or may move in an intersecting direction intersecting with both the width direction and the belt transport direction +Y in a reciprocating manner.

The media M stuck to the support surface 21*a* by the pressing unit 17 is transported in the belt transport direction +Y due to the circulation of the transporting belt 21. The recording unit 15 records an image on the media M on the support surface 21*a* at a recording position in the course of transportation of the media M by the transporting belt 21.

The holding unit 12 holds the first roll body R1 where the media M is wound. The holding unit 12 supports the first roll body R1 in a rotatable manner. The first roll body R1 held by the holding unit 12 is formed by winding the media M before recording. In the present embodiment, by driving the transporting belt 21, the media M is unwound from the first roll body R1 held by the holding unit 12. The unwound media M is transported along the transport path from the holding unit 12 toward the recording unit 15. In the present embodiment, the holding unit 12 is provided with a feeding motor 27 that serves as a drive source for feeding the media M from the first roll body R1 that the holding unit 12 holds. In a case where the holding unit 12 is configured to include the feeding motor 27, the feeding motor 27 constitutes an example of the transport unit together with the transporting unit 16.

The tension unit 13 includes a tension roller 31 as an example of a tension bar that is brought into contact with the back surface Mb of the media M between the holding unit 12 and the recording unit 15 and applies tension to the media M. The tension unit 13 has one tension roller 31 and a pair of rollers 32 capable of winding the media M around the tension roller 31. The media M can be wound around the tension roller 31 by half turn or more by the pair of rollers 32. The pair of rollers 32 is constituted of two guide rollers, that is, a first guide roller 33 and a second guide roller 34 which form a pair and are arranged side by side at positions away from the tension roller 31 toward one side. The media M unwound from the first roll body R1 is wound around a portion of an outer peripheral surface of the tension roller 31 in a state where the media M is guided by the first guide roller 33 and the second guide roller 34. At this time, due to a reaction when the media M is brought into contact with the outer peripheral surface of the tension roller 31, the tension roller 31 can press the media M in a direction away from the respective guide rollers 33, 34. With such a configuration, tension is applied to the media M. The outer peripheral surface of the tension roller 31 is a high friction surface compared to outer peripheral surfaces of the guide rollers 33, 34. The tension roller 31 may not be biased in a direction away from the respective guide rollers 33, 34 or may be biased in a direction away from the respective guide rollers 33, 34 by an elastic member such as a spring.

A user winds the media M drawn from the first roll body R1 onto the tension roller 31 in a taut state where there is no wrinkles on the media M. When the user initially sets the media M in a taut state, the media M is at least less likely to slip in the width direction by the high friction surface that is the outer peripheral surface of the tension roller 31. Accordingly, a state where the media M is stretched in the width direction is maintained during the process that the media M is wound around the tension roller 31. With such an operation, the increase in wrinkles on the media M can be suppressed. Wrinkles generated by meandering or skewing of the media M cause folding that is generated when the media M is pressed by the pressurizing roller 17*a*. In order to prevent this type of folding, the tension unit 13 maintains a state where tension in the width direction is applied to the media M thus suppressing the increase of wrinkles on the media M at a position downstream of the tension unit 13 in the transport direction Y1.

A non-rotatable tension rod may be used as an example of the tension bar instead of using the rotatable tension roller 31. In short, it is sufficient that, by applying tension to the media M, the media M is brought into close contact with the outer peripheral surface of the tension bar in a state where the back surface Mb that is a surface on a side opposite to the surface Ma that serves as a recording surface of the media M is pressed.

The peeling device 14 holds the second roll body R2 where the media M is wound. The peeling device 14 holds the second roll body R2 in a rotatable manner. The second roll body R2 held by the peeling device 14 is formed by winding the media M after passing between the recording unit 15 and the transporting belt 21. The peeling device 14 includes a winding motor 28 that serves as a drive source for winding the media M on the second roll body R2 that the peeling device 14 holds. The peeling device 14 peels off the media M from the transporting belt 21 by rotating the second roll body R2 at a predetermined rotation torque by a driving force of the winding motor 28. The peeling device 14 recovers the media M after recording, by winding the peeled media M as the second roll body R2.

A cleaning unit and a drying unit not illustrated in the drawing are disposed below the transporting belt 21. The cleaning unit is configured to clean the support surface 21*a* in order to remove a liquid such as ink or foreign substances such as fluff adhering to the support surface 21*a*. The cleaning unit cleans the support surface 21*a* by bringing a brush wetting with a cleaning liquid into contact with the support surface 21*a*, for example. The drying unit is configured to heat and dry the support surface 21*a* wetting with the cleaning liquid after the support surface 21*a* is cleaned. Below the transporting belt 21, the drying unit is positioned on an upstream side in a circulation direction of the transporting belt 21, and the drying unit is positioned on a downstream side in the circulation direction of the transporting belt 21. The cleaning of the support surface 21*a* and the drying of the support surface 21*a* wet with the cleaning liquid are sequentially performed by circulating the transporting belt 21.

In the housing 11*a*, a plurality of liquid storage containers (not illustrated) for storing a liquid such as ink are disposed. The plurality of liquid storage containers respectively contain inks of different colors including black, cyan, magenta, and yellow, for example. The liquid stored in each liquid storage container is supplied to the recording unit 15 through a tube not illustrated in the drawing. The recording unit 15 ejects the liquid supplied from the liquid storage containers from the nozzles 18N of the recording head 18. The liquid storage containers are each constituted of an ink tank, an ink cartridge, an ink pack or the like, for example.

Here, as the media M used in the recording device 11, various kinds of medias such as a fabric, a film sheet, a paper sheet can be used, and also as a material of the media M, various materials are available. For example, in a case where the media M is a fabric, as a material of the media M, polyester, acrylic, nylon, rayon, cotton, a mixture of these materials and the like can be named. Further, methods of knitting fibers using these materials, diameters of such fibers, thicknesses of medias M and the like may differ respectively. Accordingly, for example, even if medias M are made of the same material, there may be a case where the medias M differ from each other in rigidity or in an expansion and contraction form.

Further, in textile printing where an image is recorded on a fabric, in many cases, a pre-treated media M (for example, a media M to which a fixing agent or a penetrant is applied by coating or the like in advance) is used and hence, during recording processing, there may be a case where characteristics of the media M largely change.

Accordingly, in a case where printing parameters (particularly transport parameters) are simply set only based on a physical property value (rigidity value) of the media M, there is a concern that a transport trouble such as jamming occurs on the transport path due to the difference between an initial characteristic of the media M and a characteristic of the media M calculated in actual recording processing (in a printing flow).

Accordingly, it is important to set the printing parameters by sufficiently taking into account the rigidity characteristic of the media M calculated in the actual recording processing (in the printing flow).

Therefore, the recording device 11 of the present embodiment includes a wrinkle forming mechanism 30 configured to form wrinkles G on a portion of the media M on the transport path before the recording is performed, and a detection unit 40 configured to detect a state of the formed wrinkles G. The control unit 100 is configured to calculate the rigidity characteristic of the media M based on detection data of the detection unit 40. With such a configuration, the user can easily grasp the rigidity characteristic of the media M scheduled to be actually subjected to recording processing. That is, even when a plurality of types of medias M are used in the recording device 11, it is possible to perform recording processing and device adjustment suitable for each media M based on a rigidity characteristic of each media M. Accordingly, it is possible to reduce the occurrence of transport troubles such as jamming on the transport path and to improve an image quality.

Provided that the wrinkle forming mechanism 30 is configured to form wrinkles G on a portion of the media M on the transport path, the configuration of the wrinkle forming mechanism 30 is not particularly limited. For example, the wrinkle forming mechanism 30 forms wrinkles G on a portion of the media M on the transport path by generating the difference in transport speed with respect to the media M being conveyed.

In the present embodiment, the pressing unit 17 and the transporting unit 16 function as a part of the wrinkle forming mechanism 30. The pressing unit 17 is configured to change a height in a +Z direction of an end portion in a +X direction of a rotation axis of the pressurizing roller 17*a* along the X axis and a height in the +Z direction of an end portion in a −X direction of the rotation axis of the pressurizing roller 17*a* along the X axis. The rotational axis of the pressurizing roller 17*a* can be changed in height in a direction along a Z axis by a cam mechanism, for example.

With such a wrinkle forming mechanism 30, the wrinkles G are formed as follows.

Figure 2:
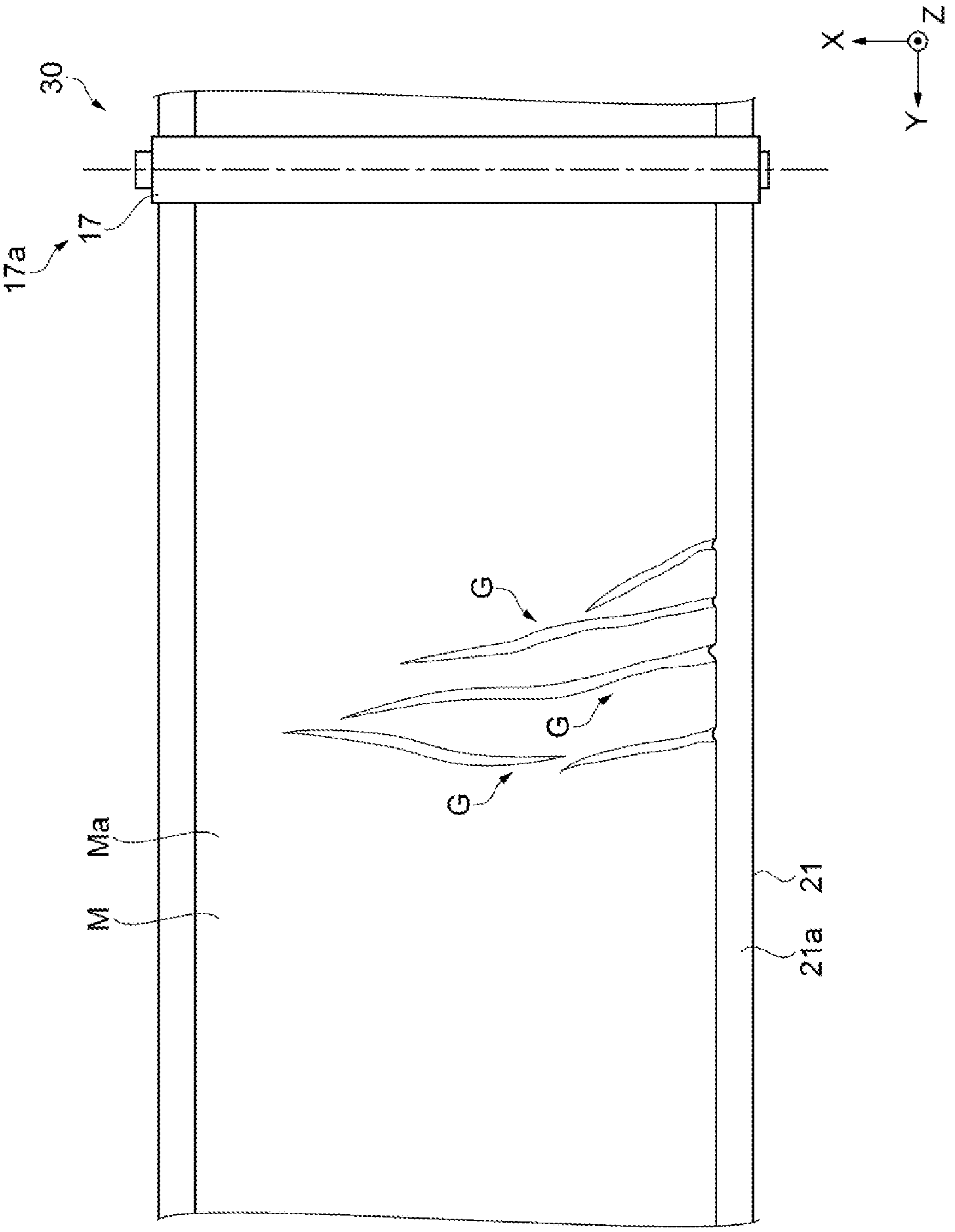
FIG. 2 is a schematic view illustrating an example of forming wrinkles by a wrinkle forming mechanism according to the first embodiment.

First, the height in the −X direction of the rotation axis of the pressurizing roller 17*a* along the X axis is set higher than the height in the +X direction of the rotation axis of the pressurizing roller 17*a* along the X axis by a fixed amount (reference amount). Then, the media M is transported in such a state. Accordingly, a pressing pressure, at the end portion in the −X direction, of the pressurizing roller 17*a* against the media M becomes weaker than a pressing pressure, at the end portion in the +X direction, of the pressurizing roller 17*a* against the media M. As a result, as illustrated in FIG. 2, a transport speed of the media M at a portion where a pressing pressure against the media M is weak becomes slower than a transport speed of the media M at a portion where a pushing pressure against the media M is strong so that wrinkles G are formed at the portion where the pressing pressure is weak. That is, in the direction along the X axis or the Y axis, the difference in transport speed occurs with respect to different portions in the media M, and the wrinkles G are formed.

The formation of the wrinkles G by the wrinkle forming mechanism 30 is performed by the control unit 100 under a prescribed condition. The wrinkles G formed under such a prescribed condition have a specific shape for each media M.

The wrinkle forming mechanism 30 may have other configurations.

For example, the wrinkle forming mechanism 30 may be configured to transport the media M in a state where the rotation axis of the pressurizing roller 17*a* along the X axis is skewed so as to intersect with the direction along the X axis by a prescribed amount. Also with such a configuration, the difference in transport speed is generated in the media M in the X axis direction so that the wrinkles G can be formed. Further, the wrinkle forming mechanism 30 may be configured to drive the peeling device 14 under a prescribed condition in a state where the transport of the media M in the holding unit 12 is stopped. Also with such a configuration, a tensile load is generated on the media M so that the wrinkles G can be formed on the media M.

The detection unit 40 includes a sensor capable of detecting a dimension, and is configured to detect a height dimension of a portion of the media M where the wrinkles G are formed. Further, the detection unit 40 is configured to detect a width dimension, in the transport direction Y1 (prescribed direction), of the portion of the media M where the wrinkles G are formed.

Figure 3:
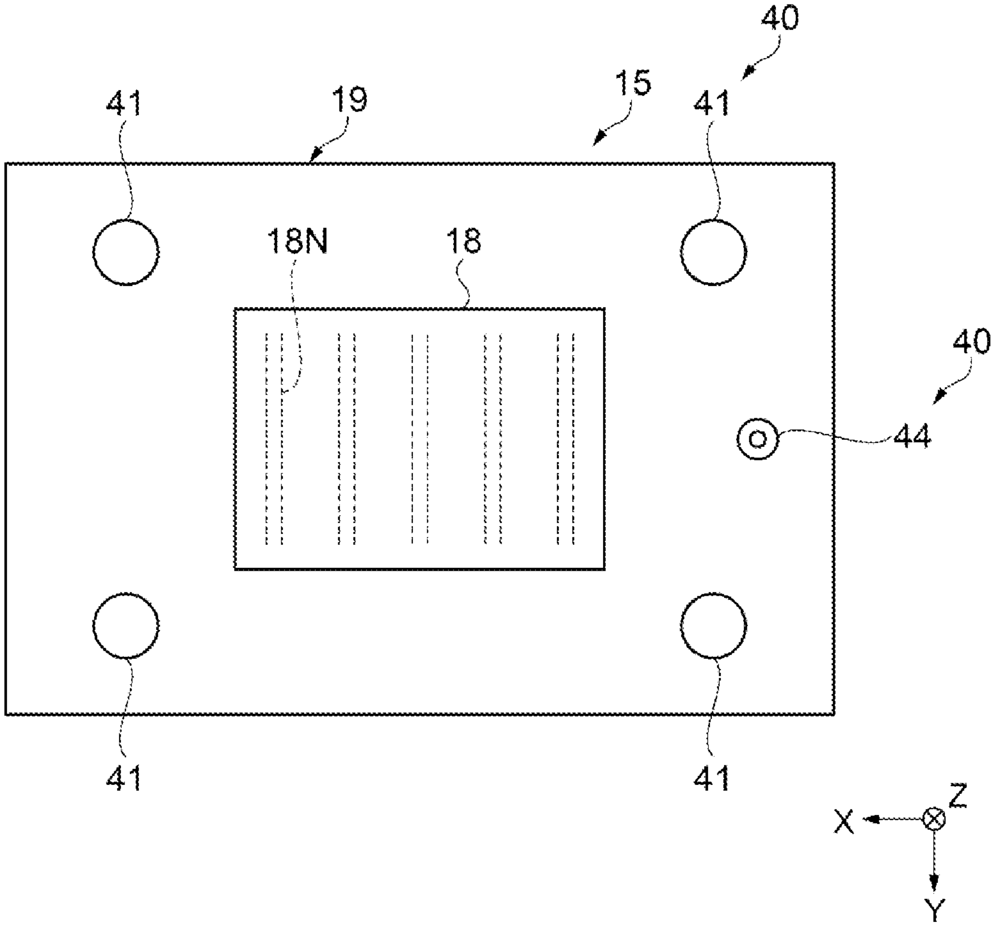
FIG. 3 is a plan view illustrating a configuration of a detection unit according to the first embodiment.

The detection unit 40 includes an ultrasonic sensor 44, for example. As illustrated in FIG. 3, the ultrasonic sensor 44 is disposed in the recording unit 15. Specifically, the ultrasonic sensor 44 of the present embodiment is disposed at an end portion of the carriage 19 in the −Z direction and at an end portion of the carriage 19 in the −X direction. Here, two or more ultrasonic sensors 44 may be provided.

Figure 4:
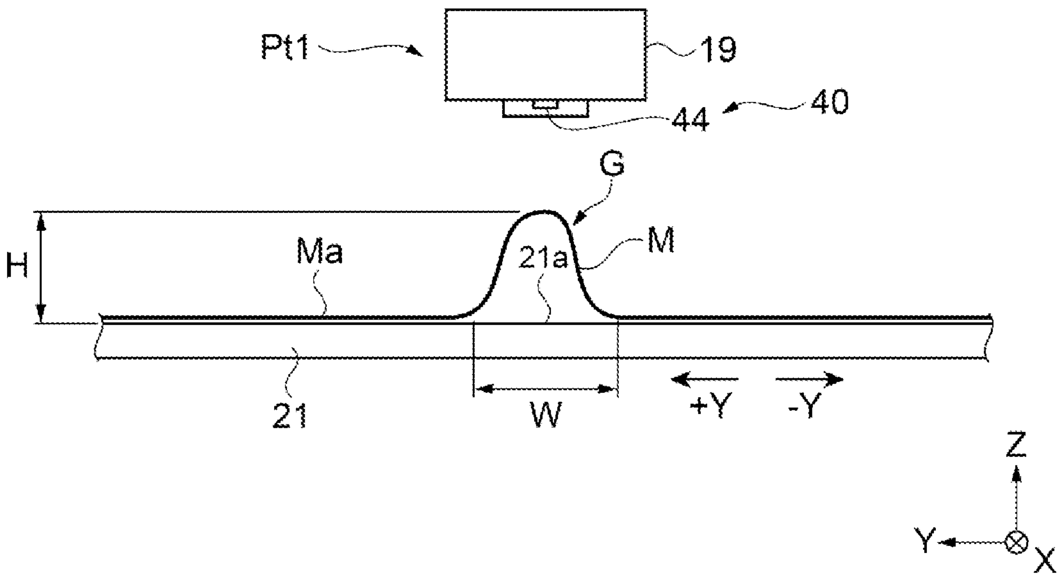
FIG. 4 is a schematic view illustrating a method of detecting wrinkles by the detection unit according to the first embodiment.

A method for detecting the wrinkles G by the ultrasonic sensor 44 is as follows. As illustrated in FIG. 4, while the media M is transported in the belt transport direction +Y or in the reverse belt transport direction −Y, the carriage 19 is moved in the direction along the X axis in a reciprocating manner. The carriage 19 is movable in a direction along the Z axis, and in the detection of the wrinkles G by the ultrasonic sensor 44, the carriage 19 is moved to a prescribed position Pt1.

The surface Ma of the media M including the wrinkles G is searched by the ultrasonic sensor 44. With such a searching, dimensional data including the height dimension H and the width dimension W of the wrinkles G are obtained. The height dimension of the wrinkle G in the present embodiment is a height of the wrinkle G in the +Z direction from the support surface 21*a* of the transport belt 21, and the width dimension W is a dimension, in the transport direction Y1, of a foot portion of the wrinkle G having a convex shape. The dimensional data detected by the ultrasonic sensor 44 is transmitted to the control unit 100.

A sensor configured to detect the dimensions is not limited to the ultrasonic sensor 44, and may be an infrared sensor, an RGB camera, or various optical sensors, for example.

Further, in the present embodiment, the detection unit 40 includes a sensor configured to detect a contact pressure, and is configured to detect a contact pressure when the sensor is brought into contact with a top portion of the wrinkle G.

The detection unit 40 includes strain sensors 41, for example. As illustrated in FIG. 3, the strain sensors 41 are disposed in the recording unit 15. Specifically, the strain sensors 41 of the present embodiment are disposed at an end portion of the carriage 19 in the −Z direction, and at respective corner portions of the carriage 19. The number of strain sensors 41 may be one, two, three, or five or more.

Figure 5:
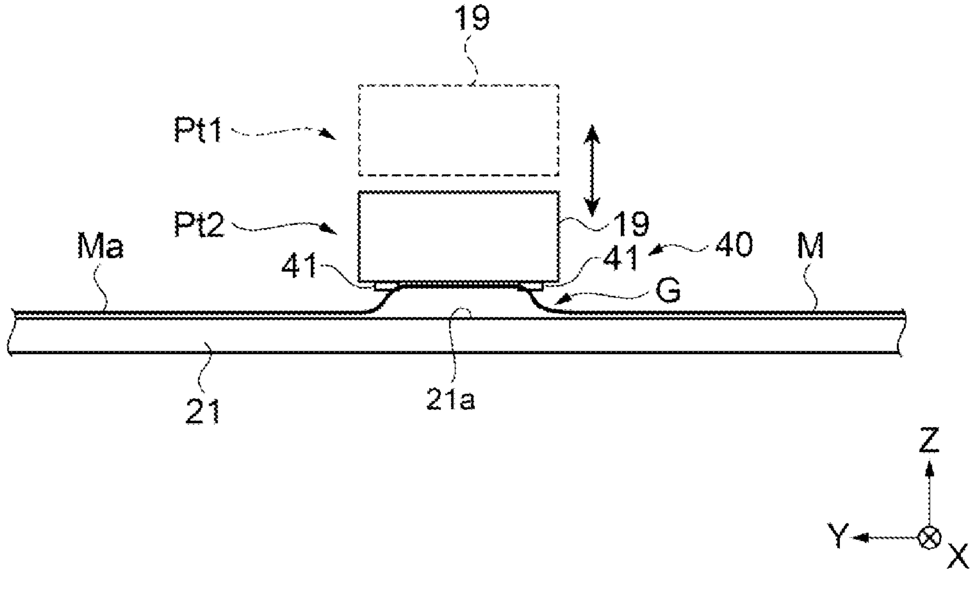
FIG. 5 is a schematic view illustrating a method of detecting wrinkles by the detection unit according to the first embodiment.

A method for detecting a contact pressure with respect to the wrinkle G by the strain sensors 41 is as follows. As illustrated in FIG. 5, in a state where the transport of the media M is stopped, the carriage 19 is moved from the prescribed position Pt1 to a prescribed position Pt2 below the prescribed position Pt1. With such an operation, the strain sensors 41 are brought into contact with a top portion of the wrinkle G, and a contact pressure is detected. The contact pressure data detected by the strain sensors 41 is transmitted to the control unit 100.

A sensor configured to detect a contact pressure is not limited to the strain sensor 41, and may be a force sensor (load cell) or the like, for example.

In the present embodiment, the detection unit 40 including the ultrasonic sensor 44 and the strain sensors 41 is mounted on the carriage 19 and hence, the configuration of the recording device 11 can be made compact compared to a case where the detection unit 40 is installed separately.

Figure 6:
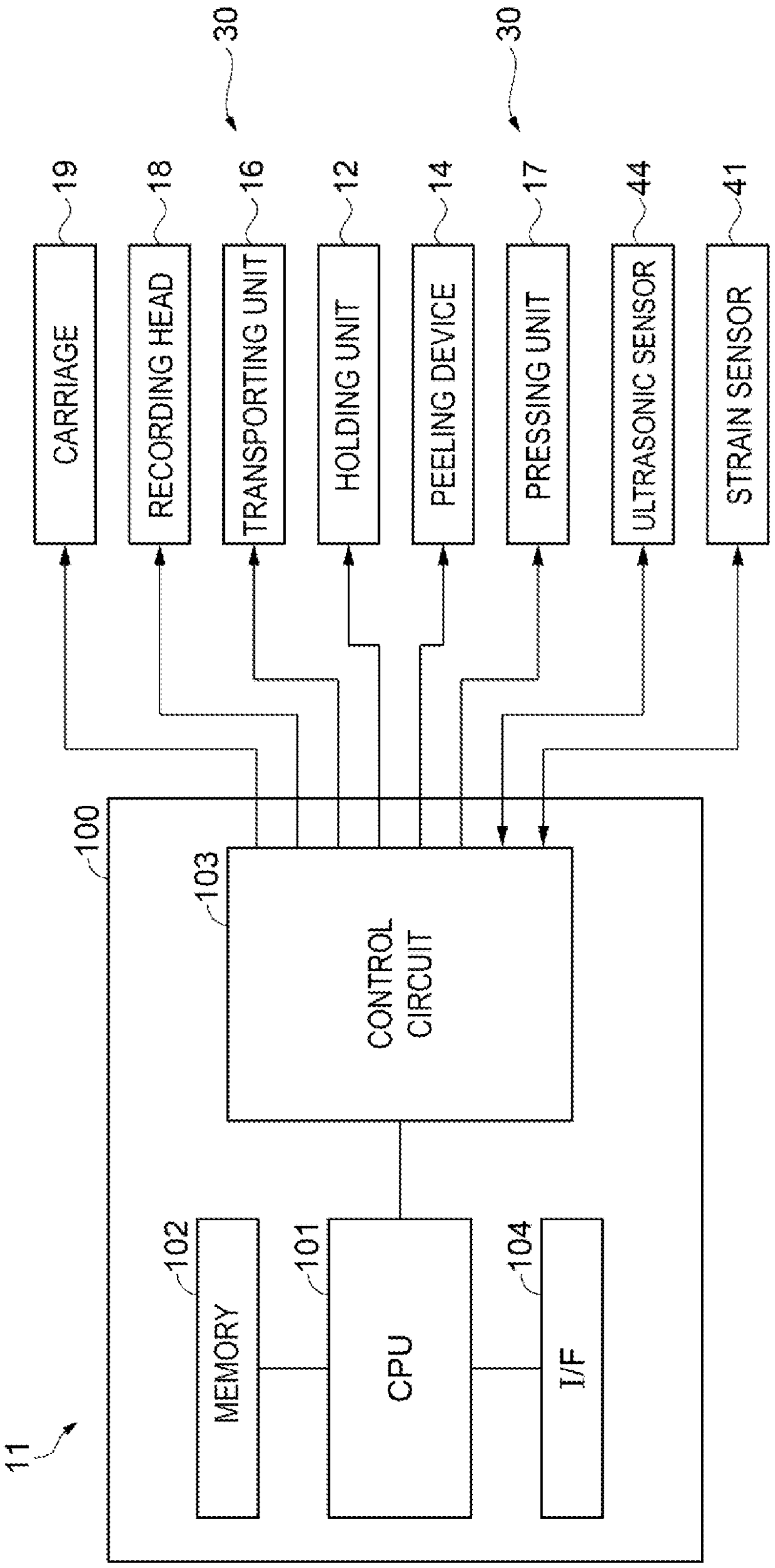
FIG. 6 is a block diagram illustrating a configuration of a control unit according to the first embodiment.

As illustrated in FIG. 6, the recording device 11 includes the control unit 100 that is configured to control various operations executed by the recording device 11. The control unit 100 includes a CPU 101, a memory 102, a control circuit 103, and an I/F (interface) 104. The CPU 101 is an arithmetic processing device. The memory 102 is a storage device that secures a region for storing programs run by the CPU 101, a work region for running the programs, or the like, and includes storage elements such as a RAM and an EEPROM. When recording data and the like are acquired from outside of an information processing terminal or the like via the I/F 104, the CPU 101 controls respective driving units and the like.

The control unit 100 is configured to control the carriage 19, the recording head 18, the transporting unit 16, the holding unit 12, the peeling device 14, the pressing unit 17, the ultrasonic sensor 44, the strain sensor 41, and the wrinkle forming mechanism 30.

The control unit 100 calculates the rigidity characteristic of the media M based on the detection data of the ultrasonic sensor 44 and the detection data of the strain sensor 41. In the present embodiment, in the memory 102 (corresponding to the storage unit), a data table where printing parameters are associated with the rigidity characteristics is stored, and the control unit 100 derives the printing parameters corresponding to the calculated rigidity characteristic. Particularly, the printing parameters are parameters relating to transporting of the media M. For example, the printing parameters include a set value of a tension with respect to the media M in the tension unit 13, a set value of a tension with respect to the media M in the peeling device 14, and a set value of a peeling angle of the media M in the peeling device 14 (an angle between the support surface 21*a* of the transporting belt 21 and the medium M at the time of peeling the media M from the transporting belt 21), and the like.

Next, the calculation of the rigidity characteristic of the media M in the recording device 11 and the control method for deriving the printing parameters are described.

Firstly, the control unit 100 drives the wrinkle forming mechanism 30 before recording is performed on the media M, and allows the wrinkle forming mechanism 30 to form the wrinkles G on a portion of the media M used in the recording. In the present embodiment, the control unit 100 allows the pressing unit 17 and the transporting unit 16 to perform a prescribed operation as the wrinkle forming mechanism 30. With such an operation, the specific wrinkles G are formed on the media M used in the recording (see FIG. 2).

Next, the control unit 100 drives the carriage 19 and the ultrasonic sensor 44 to detect dimensional data relating to the height dimension H and the width dimension W of each wrinkle G (see FIG. 4). The control unit 100 acquires the detected dimensional data.

Further, the control unit 100 drives the carriage 19 and the strain sensors 41 to detect a contact pressure when the strain sensors 41 are brought into contact with a top portion of each wrinkle G (see FIG. 5). The control unit 100 acquires the detected contact pressure data.

Next, the control unit 100 calculates the rigidity characteristic of the media M based on the acquired detection data (the dimensional data and the contact pressure data). For example, the rigidity characteristic is calculated by ranking the acquired detection data with respect to the reference value, that is, based on whether the detected values are higher or lower than the reference value.

Specifically, for example, when a value of the dimensional data relating to the height dimension is higher than the reference value, the control unit 100 calculates (performs ranking of) the rigidity characteristic that the media M is soft.

Further, for example, when a value of the dimensional data relating to the width dimension is larger than the reference value, the control unit 100 calculates (performs ranking of) the rigidity characteristic that the media M is hard.

Still further, for example, when a value of the contact pressure data is larger than the reference value, the control unit 100 calculates (performs ranking of) the rigidity characteristic that the media M is hard.

The control unit 100 comprehensively determines the three calculated rigidity characteristics, and calculates the final rigidity characteristic of the media M. For example, pattern data of the variously ranked rigidity characteristics are stored in the memory 102, and the pattern data approximate to the final rigidity characteristic is selected based on the ranking of the acquired height dimensional data, width dimensional data, and contact pressure data. The selected pattern data becomes the rigidity characteristic of media M.

Next, the control unit 100 derives printing parameters on the data table based on the calculated rigidity characteristic. The derived printing parameters are displayed on an operating panel not illustrated in the drawing, for example.

Next, the control unit 100 changes set values for the respective driving units based on the printing parameters. For example, according to printing parameters for a relatively soft media M, a tension applied to the media M at the tension unit 13 is weakened. In the case of the peeling device 14, a tension at the time of winding the media M is weakened. Further, an angle at which the media M is peeled off in the peeling device 14 (an angle between the support surface 21*a* of the transporting belt 21 and the media M at the time of peeling-off the media M from the transporting belt 21) is made to approach the horizontal direction (180°). Due to the installation of the tension unit 13 and the peeling device 14, the transport condition where expansion and contraction characteristics of the media M in the transport direction Y1 and in the width direction are taken into account is optimized and hence, the occurrence of the transport trouble such as jamming and the generation of the wrinkles G on the transport path can be suppressed.

Then, after the appropriate printing parameters are set in the recording device 11, actual recording processing is executed.

Specifically, the transporting belt 21 is driven. With such an operation, the media M is unwound from the first roll body R1 held by the holding unit 12. To the unwound media M, a tension is applied by the tension roller 31 of the tensioning unit 13. The pressing unit 17 is driven, and the media M is pressed, and the media M is stuck to the transporting belt 21. Next, the recording unit 15 is driven, and recording is performed, at the recording position, to the media M that is stuck to the support surface 21*a* of the transporting belt 21. Next, the peeling device 14 is driven, and the media M after recording that is stuck to the support surface 21*a* of the transporting belt 21 is peeled off from the transporting belt 21. By circulating the transporting belt 21 in this manner, sticking of the media M, recording on the media M, and the peeling-off of the media M after recording are sequentially performed as the recording processing.

As described above, according to the present embodiment, by detecting a state of the wrinkles G of the media M, to which recording is actually performed, in the transport path in the recording device 11, rather than simply using the physical property value related to the rigidity of the media M, it is possible to grasp the rigidity characteristic of the media M based on an actual condition influenced by a state of the recording device 11 at the time of detecting the state of the wrinkles G, an environmental situation around the recording device 11 such as a temperature, a humidity, and the like. Further, the calculation of the rigidity characteristic is based on the height dimensional data, the width dimensional data, and the contact pressure data and hence, the calculation accuracy can be increased. Then, it is possible to acquire the printing parameters suitable for the media M from the rigidity characteristic. Accordingly, the recording processing is performed in a state where the appropriate printing parameters are set, and the occurrence of transport troubles such as jamming on the transport path can be reduced.

Particularly, in the case where the recording processing is performed on the fabric, it is possible to acquire the rigidity characteristic of the pre-treated media M and hence, it is possible to suppress the occurrence of wrinkles on the media M, and the occurrence of banding (streak unevenness, density unevenness) during the recording processing.

In the present embodiment, the detection unit 40 is installed on the carriage 19. However, the present disclosure is not limited to such a configuration. For example, the present disclosure may be configured to include the detection unit 40 separately from the carriage 19.

2. Second Embodiment

Next, a configuration of another recording device 110 is described. The recording device 110 is an inkjet printer.

Figure 7:
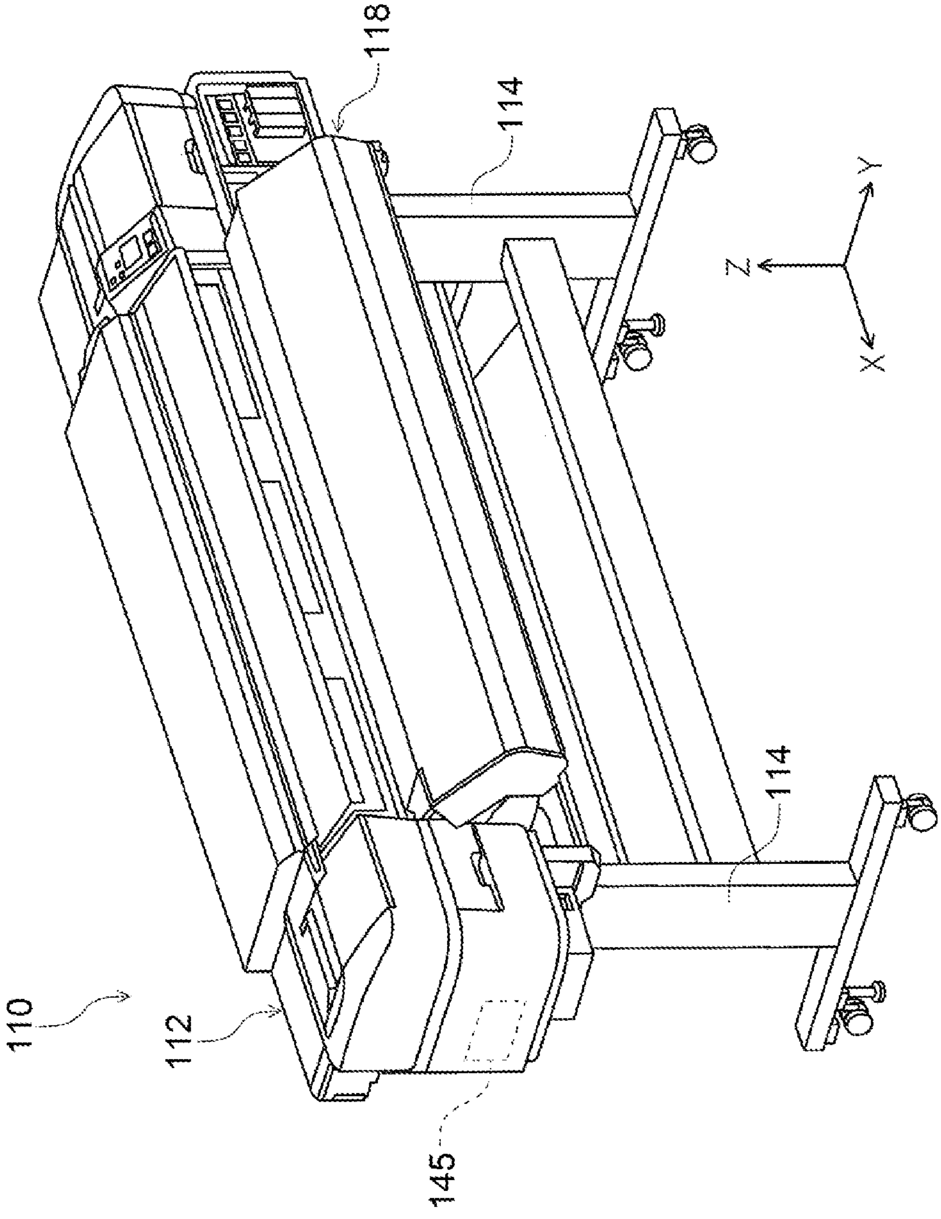
FIG. 7 is a perspective view illustrating a configuration of a recording device according to a second embodiment.
Figure 8:
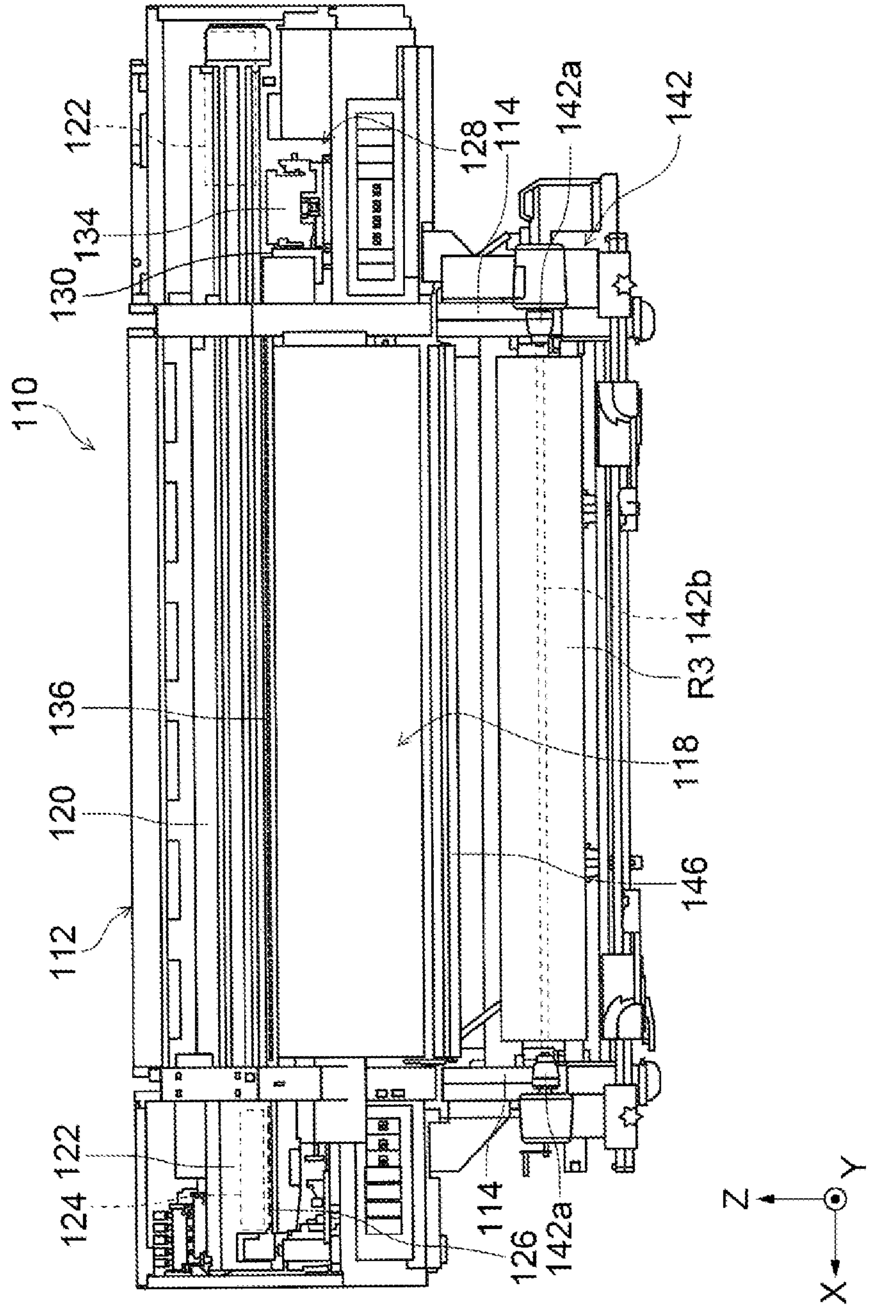
FIG. 8 is a plan view illustrating a configuration of the recording device according to the second embodiment.
Figure 9:
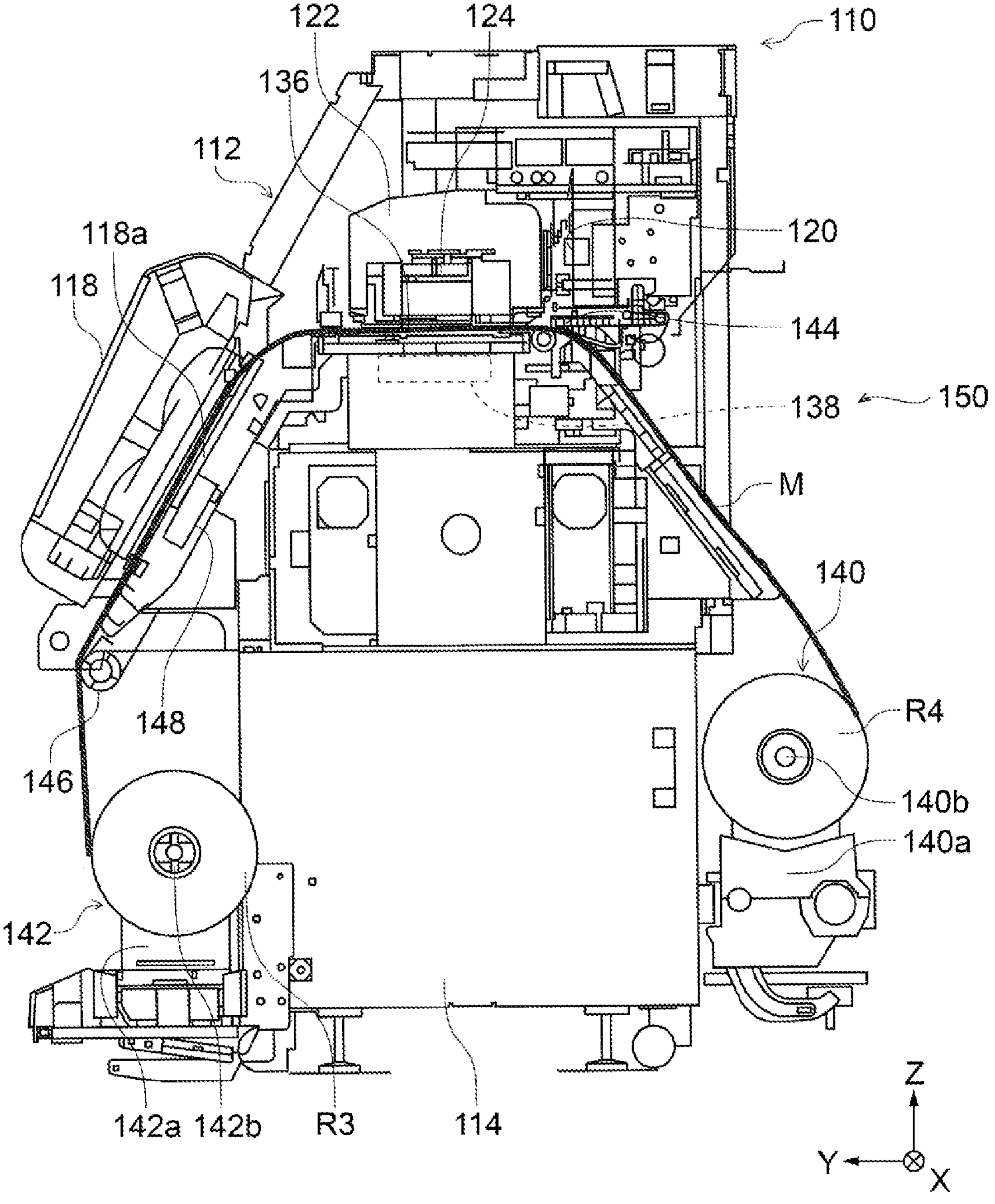
FIG. 9 is a schematic side cross-sectional view illustrating the configuration of the recording device according to the second embodiment.

As illustrated in FIG. 7, FIG. 8, and FIG. 9, the recording device 110 includes a body portion 112 and a pair of leg portions 114. The pair of leg portions 114 is mounted on a lower portion of the body portion 112 in a spaced apart manner in a direction along the X axis. The leg portions 114 extend downward from the lower portion of the body portion 112.

The body portion 112 is formed in a rectangular parallelepiped shape, and a drying unit 118 is mounted on a front surface side (a +Y direction side) of the body portion 112. A main frame 120 extending in a direction along the X axis is mounted on an upper portion of the body portion 112. A carriage 122 that constitutes a recording unit is attached to a front surface side of the main frame 120. The carriage 122 is configured to move along the main frame 120 in a direction along the X axis in a reciprocating manner. A recording head 124 that constitutes the recording unit is disposed on a lower portion of the carriage 122.

The recording head 124 includes a plurality of nozzles (not illustrated) capable of ejecting ink as a liquid downward. Specifically, a lower surface of the recording head 124 is formed as a nozzle surface including the plurality of nozzles.

As illustrated in FIG. 8, in the present embodiment, an end portion of the body portion 112 on a +X direction side (one side) is set as a home position of the carriage 122. In the body portion 112, a cap 126 is disposed at the home position. The cap 126 is configured to cover the nozzle surface of the recording head 124 in a state where the recording head 124 is at the home position.

Further, a maintenance mechanism 128 is disposed on an end portion of the body portion 112 on a −X direction side. In the present embodiment, the maintenance mechanism 128 includes a flushing receiving portion 130, a wiper 134, and the like. The flushing receiving portion 130 receives ink forcibly ejected from the recording head 124. In the flushing receiving portion 130, for example, an ink absorber is disposed as an example of a configuration of absorbing the ejected ink. The wiper 134 is constituted as a fabric member, for example, and is configured to move in a direction along the Y axis. The wiper 134 is configured to wipe the lower surface of the recording head 124, that is, the nozzle surface.

In the present embodiment, the carriage 122 is configured to move between the home position at the end portion in the +X direction side and a maintenance position at the end portion in the −X direction side where the maintenance mechanism 128 is disposed.

Further, in the direction along the X axis, between the cap 126 and the flushing receiving portion 130, a flat plate-shaped suction platen 136 extending in the X axis direction is provided. Although not illustrated in the drawings, a plurality of ribs are provided on an upper surface of the suction platen 136 so as to extend in a direction along the Y axis and at proper intervals in the direction along the X axis. A plurality of through holes (not illustrated) are formed between the plurality of ribs so as to penetrate the suction platen 136 in a direction along the Z axis.

A suction fan 138 (FIG. 9) is disposed below the suction platen 136. When the suction fan 138 is driven, a gas on a side above the suction platen 136 is suctioned through the through holes formed in the suction platen 136. With such a configuration, a gas flow from above to below the suction platen 136 is formed. As a result, in a state where the media M is positioned on the suction platen 136, the media M is suctioned by the suction platen 136, and is pressed to the upper surface of the suction platen 136.

As illustrated in FIG. 9, a paper feeding unit 140 is provided on a back surface side (−Y axis direction side) of the recording device 110, and a paper discharging unit 142 is provided below the drying unit 118 on a front surface side (+Y axis direction side) of the recording device 110. In FIG. 7, the illustration of the paper feeding unit 140 and the illustration of the paper discharging unit 142 are omitted. In FIG. 9, the media M is illustrated by a bold line.

The paper discharging unit 142 includes a pair of bearing portions **142*a* and a spindle 142*b*. The pair of bearing portions 142*a* is configured to move in a direction along the X axis that is a direction that the bearing portions 142*a* approach each other or are separated from each other. The spindle 142*b* is inserted into an inner peripheral portion of the paper discharging roll R3. Both end portions of the spindle 142*b* are supported by the pair of bearing portions 142*a*. A driving force is supplied to the bearing portions 142*a* by a drive source not illustrated in the drawings and hence, the media M can be wound on the paper discharging roll R3 supported by the spindle 142*b***. That is, a configuration is provided where a front tension is applied to the media M.

In the same manner, the paper feeding unit 140 also includes a pair of bearing portions **140*a* that are movable in a direction along the X axis, and a spindle 140*b*. The spindle 140*b* is inserted into an inner peripheral portion of the paper feeding roll R4. Both end portions of the spindle 140*b* are supported by the pair of bearing portions 140*a*. A driving force is supplied to the bearing portions 140*a* from a drive source not illustrated in the drawings and hence, the media M can be fed to a downstream side in the transport direction from the paper feeding roll R4 supported by the spindle 140*b*. Here, the bearing portions 140*a*** are configured to control drawing of the media M such that a back tension is applied to the media M drawn from the paper feeding roll R4.

In the present embodiment, the media M is drawn from the paper feeding roll R4 of the paper feeding unit 140, and is wound on the paper discharging roll R3 of the paper discharging unit 142 after passing through the suction platen 136 and the drying unit 118.

A transport roller 144 is disposed on an upstream side of the suction platen 136 in the transport direction of the media M. The transport roller 144 is constituted as a driving roller driven by a drive source not illustrated in the drawings. The transport roller 144 is configured to be rotatable in a normal rotation direction and a reverse rotation direction. In the present embodiment, the normal rotation direction is a direction that the media M wound on the paper feeding roll R4 is drawn and fed to a downstream side in the transport direction, and the reverse rotation direction is a direction that the media M is fed from the downstream side to an upstream side in the transport direction.

A discharge roller 146 is disposed on a downstream side of the drying unit 118. The discharge roller 146 is constituted as a driving roller driven by a drive source not illustrated in the drawings.

The drying unit 118 includes a heater (not illustrated) as a heating source. The heater is configured to heat the media M positioned in the drying unit 118, and to accelerate drying of the media M by evaporating moisture of ink absorbed by the media M. A suction fan 148 is provided in the drying unit 118. The suction fan 148 extends along the transport path of the media M in the drying unit 118, and is attached to a lower surface side of a path forming member **118*a*** that constitutes a portion of the transport path.

In the present embodiment, a plurality of through holes (not illustrated) are formed in the path forming member **118*a*, and when the suction fan 148 is driven, a gas on an upper side of the path forming member 118*a* is suctioned through the through holes. Accordingly, a gas flow from above to below the path forming member 118*a* is formed. As a result, in a state where the media M is positioned above the path forming member 118*a* of the drying unit 118, the media M is suctioned to the path forming member 118*a* and is pressed to an upper surface of the path forming member 118*a***.

Further, the recording device 110 of the present embodiment includes a wrinkle forming mechanism 150 configured to form wrinkles G on a portion of the media M on the transport path before recording is performed, and a detection unit 40 configured to detect a state of the formed wrinkles G. Further, a control unit 145 is configured to calculate a rigidity characteristic of the media M based on detection data of the detection unit 40. With such a configuration, a user can easily grasp the rigidity characteristic of the media M and hence, it is possible to reduce the occurrence of transport troubles such as jamming on the transport path thus improving an image quality.

Provided that the wrinkle forming mechanism 150 is configured to form the wrinkles G on a portion of the media M on the transport path, the configuration of the wrinkle forming mechanism 150 is not particularly limited.

The wrinkle forming mechanism 150 of the present embodiment includes the suction platen 136 (corresponding to the support unit) that supports the media M in the transport path, and the suction fan 138 (corresponding to the suction mechanism) that suctions the media M supported on the suction platen 136 toward a suction platen 136 side, and the wrinkle forming mechanism 150 is configured to form the wrinkles G on a portion of media M on the suction platen 136 by generating the difference in suction force with respect to the media M by the suction fan 138. That is, in the direction along the X axis or the Y axis, the difference in suction force is generated with respect to different portions in the media M and hence, the wrinkles G are formed.

In the present embodiment, out of the plurality of through holes formed in the suction platen 136 in a penetrating manner, a specific through hole is configured to be closeable.

Figure 10:
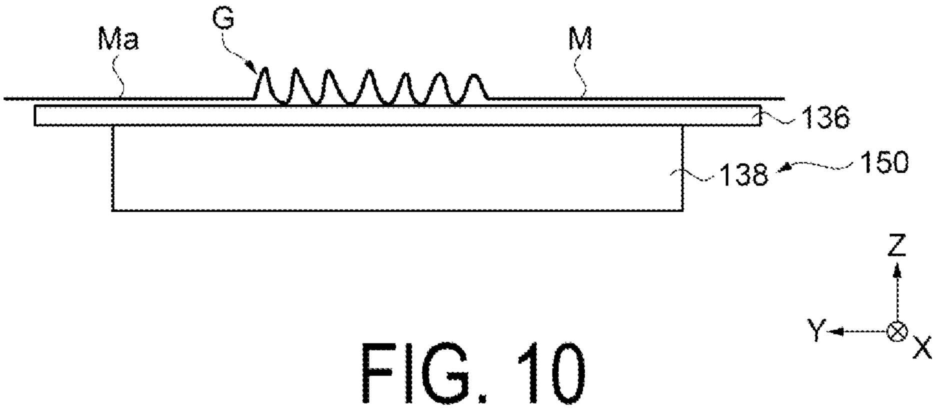
FIG. 10 is a schematic view illustrating an example of forming wrinkles by a wrinkle forming mechanism according to the second embodiment.

Further, in a state where the specific through hole is closed, the suction fan 138 is driven under a certain condition. With such an operation, the media M is not uniformly suctioned, and a portion that is suctioned to the suction platen 136 and a portion that is not suctioned are generated in the media M. As a result, as illustrated in FIG. 10, the difference in suction force is generated in the media M, and the wrinkles G are formed on the media M on the suction platen 136.

The wrinkle forming mechanism 150 is controlled by the control unit 145 under a prescribed condition. Accordingly, it is possible to form the specific wrinkles G for each media M.

The wrinkle forming mechanism 150 may have other configurations. For example, the wrinkle forming mechanism 150 may be configured to stop the paper feeding unit 140 in a state where the media M is uniformly suctioned to the suction platen 136 by driving the suction fan 138, and to drive the paper discharging unit 142 in the transport direction of the media M. Also with such a configuration, a load is applied to a portion of the media M that is suctioned to the suction platen 136 and hence, wrinkles G can be formed on the media M on the suction platen 136.

The detection unit 40 includes sensors configured to detect dimensions, and is configured to detect a height dimension of a portion where the wrinkle G is formed. Further, the detection unit 140 is configured to detect a width dimension, in the transport direction of the media M, of the portion where the wrinkle G is formed.

In the same manner as first embodiment, the detection unit 40 of this embodiment is configured to include an ultrasonic sensor 44 and strain sensors 41. The ultrasonic sensor 44 and the strain sensors 41 are disposed on the carriage 122.

Figure 11:
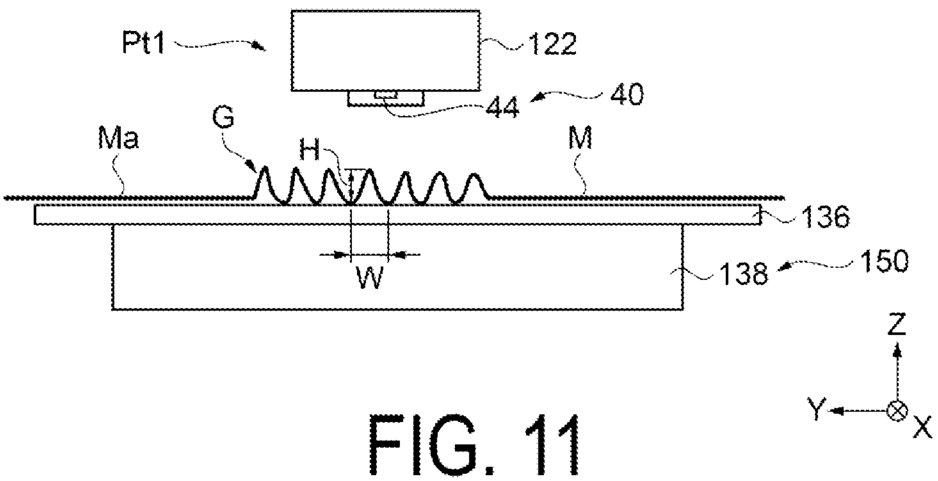
FIG. 11 is a schematic view illustrating a method for detecting wrinkles by a detection unit according to the second embodiment.

A method for detecting wrinkles G by the ultrasonic sensor 44 is as follows. As illustrated in FIG. 11, while the media M is transported in the transport direction, the carriage 122 is moved in a direction along the X axis in a reciprocating manner. The carriage 122 is movable in a direction along the Z axis, and in the detection of the wrinkles G by the ultrasonic sensor 44, the carriage 122 is moved to a prescribed position Pt1.

A surface Ma of the media M including the wrinkles G is searched by the ultrasonic sensor 44. With such a searching, the dimensional data including height dimensions H and width dimensions W of the wrinkles G are detected. The height dimensions of the wrinkles G in the present embodiment are heights of the wrinkles G in the +Z direction from the support surface of the suction platen 136, and the width dimensions W are dimensions of foot portions of the wrinkles G each having a convex shape. The dimensional data detected by the ultrasonic sensor 44 is transmitted to the control unit 145.

Figure 12:
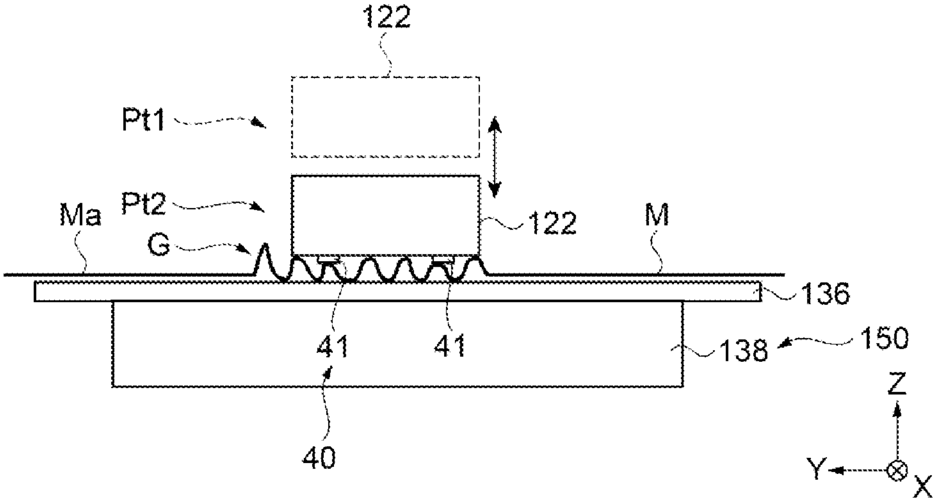
FIG. 12 is a schematic view illustrating a method for detecting wrinkles by the detection unit according to the second embodiment.

A method for detecting a contact pressure with respect to the wrinkles G by the strain sensors 41 is as follows. As illustrated in FIG. 12, in a state where the transport of the media M is stopped, the carriage 122 is moved from the prescribed position Pt1 to a prescribed position Pt2 below the prescribed position Pt1. With such an operation, the strain sensors 41 are brought into contact with top portions of the wrinkles G, and contact pressures are detected. The contact pressure data detected by the strain sensors 41 is transmitted to the control unit 145.

Figure 13:
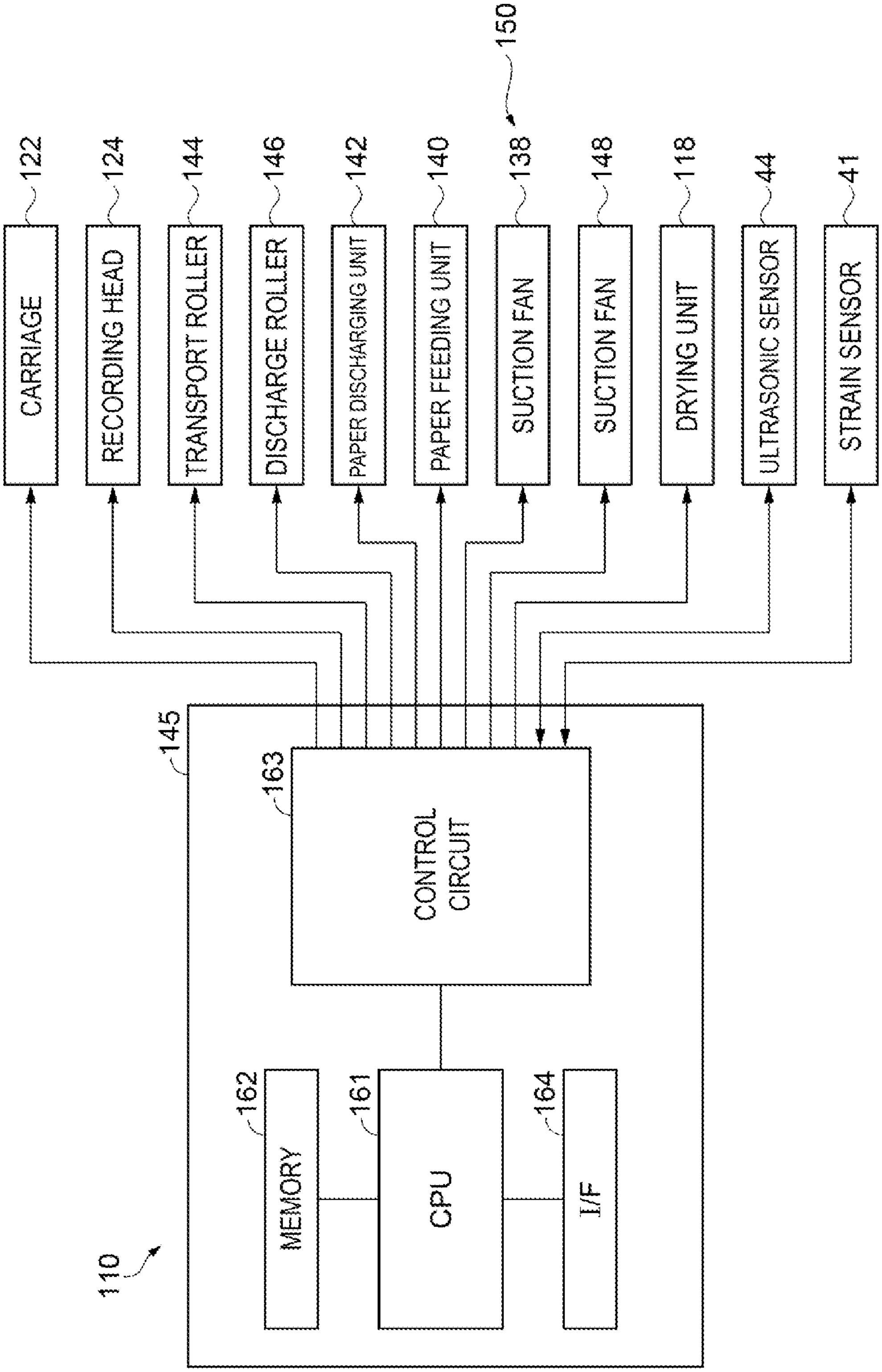
FIG. 13 is a block diagram illustrating a configuration of a control unit according to the second embodiment.

As illustrated in FIG. 13, the recording device 110 includes the control unit 145 that is configured to control various operations executed by the recording device 110. The control unit 145 includes a CPU 161, a memory 162, a control circuit 163, and an I/F (interface) 164. The CPU 161 is an arithmetic processing device. The memory 162 is a storage device that secures a region for storing programs run by the CPU 161, a work region for running the programs, or the like, and includes storage elements such as a RAM and an EEPROM. When recording data and the like are acquired from outside of an information processing terminal or the like via the I/F 164, the CPU 161 controls respective driving units and the like.

The control unit 145 calculates the rigidity characteristic of the media M based on the detection data of the ultrasonic sensor 44 and the detection data of the strain sensors 41. In the present embodiment, in the memory 162 (corresponding to the storage unit), a data table where printing parameters are associated with the rigidity characteristics is stored, and the control unit 145 derives the printing parameters corresponding to the calculated rigidity characteristic. Particularly, the printing parameters are parameters relating to transporting of the media M. For example, the printing parameters include a set value of a tension with respect to the media M in the paper feeding unit 140, a set value of a tension with respect to the media M in the paper discharging unit 142 and the like.

Next, the calculation of the rigidity characteristic of the media M in the recording device 110 and the control method for deriving the printing parameters are described.

First, the control unit 145 drives the wrinkle forming mechanism 150 before recording is performed on the media M, and allows the wrinkle forming mechanism 150 to form the wrinkles G on a portion of the media M used in the recording. In the present embodiment, the control unit 145 allows the suction fan 138 to perform a prescribed operation as the wrinkle forming mechanism 150. With such an operation, specific wrinkles G are formed on the media M used in the recording (see FIG. 10).

Next, the control unit 145 drives the carriage 122 and the ultrasonic sensor 44 to detect the dimensional data relating to the height dimension H and the width dimension W of the wrinkles G (see FIG. 11). The control unit 145 acquires the detected dimensional data.

Further, the control unit 145 drives the carriage 122 and the strain sensors 41 to detect a contact pressure when the strain sensors 41 are brought into contact with top portions of the wrinkles G (see FIG. 12). The control unit 145 acquires the detected contact pressure data.

Next, the control unit 145 calculates the rigidity characteristic of the media M based on the acquired detection data (the dimensional data and the contact pressure data). For example, the rigidity characteristic is calculated by ranking the acquired detection data with respect to the reference value, that is, based on whether the detected values are higher or lower than the reference value.

Specifically, for example, when a value of the dimensional data relating to the height dimension is higher than the reference value, the control unit 145 calculates (performs ranking of) the rigidity characteristic that the media M is soft.

Further, for example, when a value of the dimensional data relating to the width dimension is larger than the reference value, the control unit 145 calculates (performs ranking of) the rigidity characteristic that the media M is hard.

Still further, for example, when a value of the contact pressure data is larger than the reference value, the control unit 145 calculates (performs ranking of) the rigidity characteristic that the media M is hard.

The control unit 145 comprehensively determines the three calculated rigidity characteristics, and calculates the final rigidity characteristic of the media M. For example, pattern data where the rigidity characteristics are ranked variously are stored in the memory 162, and the pattern data approximate to the final rigidity characteristic is selected based on the ranking of the acquired height dimensional data, width dimensional data, and contact pressure data. The selected pattern data becomes the rigidity characteristic of media M.

Next, the control unit 145 derives printing parameters on the data table based on the calculated rigidity characteristic. The derived printing parameters are displayed on an operating panel not illustrated in the drawing, for example.

Next, the control unit 145 changes set values for the respective driving units based on the printing parameters. For example, according to printing parameters for a relatively soft media M, a tension applied to the media M at the paper feeding unit 140 is weakened. In the case of the paper discharging unit 142, a tension at the time of winding the media M is weakened. With such an operation, elongation of the media M in the transport direction is optimized, and occurrence of transport troubles such as jamming and the generation of the wrinkles G on the transport path can be suppressed.

Then, after the appropriate printing parameters are set in the recording device 110, actual recording processing is executed.

As described above, according to the present embodiment, by detecting a state of the wrinkles G of the media M to which recording is actually performed on the transport path in the recording device 110, it is possible to grasp the rigidity characteristic of the media M based on an actual condition influenced by a state of the recording device 110, an environmental situation around the recording device 110 such as a temperature, a humidity, and the like. Then, it is possible to acquire the printing parameters suitable for the media M from the rigidity characteristic. Accordingly, the recording processing is performed in a state where the appropriate printing parameters are set, and the occurrence of transport troubles such as jamming on the transport path and the generation of the wrinkles G can be reduced.

In the wrinkle forming mechanism 150 of the present embodiment, the wrinkles G are formed on the media M on the suction platen 136. However, the present disclosure is not limited to such a configuration. For example, the wrinkles G may be formed on the media M on the path forming member 118*a* or the wrinkles G may be formed on the media M between the suction platen 136 and the path forming member 118*a* in the transport path.

When the wrinkles G are formed on the media M on the path forming member 118*a*, the suction fan 148 is driven in a state where a specific through hole is closed out of the plurality of through holes formed in the path forming member 118*a*. With such an operation, the media M is not uniformly suctioned, and a portion that is suctioned by the suction fan 148 and a portion that is not suctioned are generated in the media M. Accordingly, the difference in suction force is generated in the media M, and the wrinkles G can be formed on the media M on the path forming member 118*a*.

Further, when the wrinkles G are formed on the media M between the suction platen 136 and the path forming member 118*a* in the transport path, the driving of the paper discharging unit 142 is stopped in a state where the media M is suctioned on the path forming member 118*a*, so that the transport of the media M is stopped. In such a state, a prescribed amount of media M is transported in the transport direction by the paper feeding unit 140. Since the media M is not being transported on the path forming member 118*a*, curved portions (wrinkles G) can be formed on the media M on an upstream side of the path forming member 118*a*, that is, between the suction platen 136 and the path forming member 118*a*. Further, in this case, the detection unit 40 is provided separately from the carriage 122. Even with such a configuration, substantially the same advantageous effects as the above-described configuration can be obtained.

3. Third Embodiment

Next, a configuration of the information processing system 200 is described.

In the above-described embodiment, after detecting the state of the wrinkles G in the recording device 11, the rigidity characteristic is calculated, and the printing parameters are derived. However, the execution of processing of calculating the rigidity characteristic and processing of deriving the printing parameters, for various types of medias M, increases a load on a control unit 100. Further, when a new media M is used, information of the new media M is not compiled into a database in the existing control unit 100 and hence, there may be a case where the control unit 100 cannot cope with the new media M. In this case, it takes man-hours for acquiring conditions for deriving printing parameters and the like.

Accordingly, by constructing the information processing system 200 of the present embodiment, the burden on the user can be reduced.

Hereinafter, the information processing system 200 is described in detail.

Figure 14:
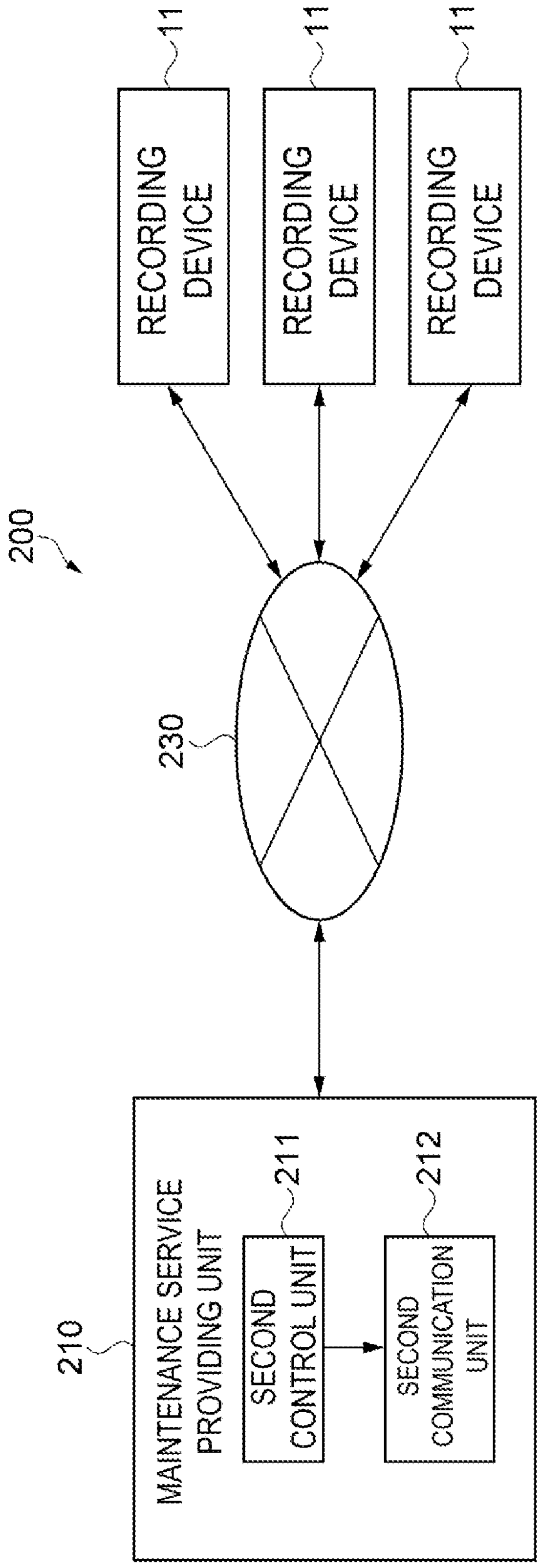
FIG. 14 is a schematic view illustrating a configuration of an information processing system according to a third embodiment.

As illustrated in FIG. 14, the information processing system 200 includes a maintenance service providing unit 210, recording devices 11, and a communication circuit 230 that connects the maintenance service providing unit 210 and the recording devices 11 to each other, and the maintenance service providing unit 210 and the recording devices 11 are communicably connected to each other via the communication circuit 230.

The information processing system 200 of the present embodiment is exemplified by taking a case where a plurality of the recording devices 11 are connected to the communication circuit 230 as an example. It is sufficient for the information processing system 200 to be configured such that the maintenance service providing unit 210 and at least one recording device 11 are connected to each other via the communication circuit 230. The configuration of the communication circuit 230 is not particularly limited, and provided that the bidirectional communication is available between the maintenance service providing unit 210 and the recording device 11, the communication between the maintenance service providing unit 210 and the recording device 11 may be a wired communication or a wireless communication.

The recording device 11 includes: a transporting unit 16 configured to transport a media M along a transport path, a recording unit 15 configured to perform recording on the media M transported, a wrinkle forming mechanism 30 configured to form wrinkles G on a portion of the media M on the transport path, a detection unit 40 configured to detect a state of a portion of the media M where the wrinkles G are formed, an I/F 104 including a first communication unit configured to communicate with the maintenance service providing unit 210, and the control unit 100 (corresponding to the first control unit).

The basic configuration of the recording device 11 is substantially the same as the configuration in the first embodiment and hence, the description of the basic configuration is omitted. In the present embodiment, the recording device 110 according to the second embodiment may be used in place of the recording device 11.

The I/F 104 has a network connection function for connecting the recording device 11 to the communication circuit 230. The I/F 104 is configured to transmit detection data detected by the detection unit 40 to the maintenance service providing unit 210 via the communication circuit 230. That is, the I/F 104 is configured to specify a target recording device 11 from the plurality of recording devices 11 connected to the maintenance service providing unit 210 via the communication circuit 230. As specific information, information including individual information for specifying the recording device 11, positional information for specifying a position of the recording device 11, and the like can be named. For example, an IP address, a serial number (production number) and the like intrinsic to the recording device 11 are applied.

The maintenance service providing unit 210 is a server device. The maintenance service providing unit 210 includes a second communication unit 212 configured to communicate with the recording device 11, a memory (corresponding to the storage unit) in which a data table where printing parameters are associated with the rigidity characteristics is stored, and a second control unit 211. The second communication unit 212 has a network connection function for connecting the maintenance service providing unit 210 to the communication circuit 230.

The second control unit 211 includes a CPU, a memory, and a control circuit. The CPU is an arithmetic processing device. The memory is a storage device that secures a region for storing programs run by the CPU, a work region for running the programs, or the like, and includes storage elements such as a RAM and an EEPROM.

The control unit 100 is configured to allow the maintenance service providing unit 210 to transmit detection data detected by the detection unit 40, and the second control unit 211 is configured to calculate a rigidity characteristic of a media M based on the received detection data, to derive printing parameters corresponding to the calculated rigidity characteristic, and to transmit the derived printing parameters to the recording device 11.

Next, a method for controlling the information processing system 200 is described.

Figure 15:
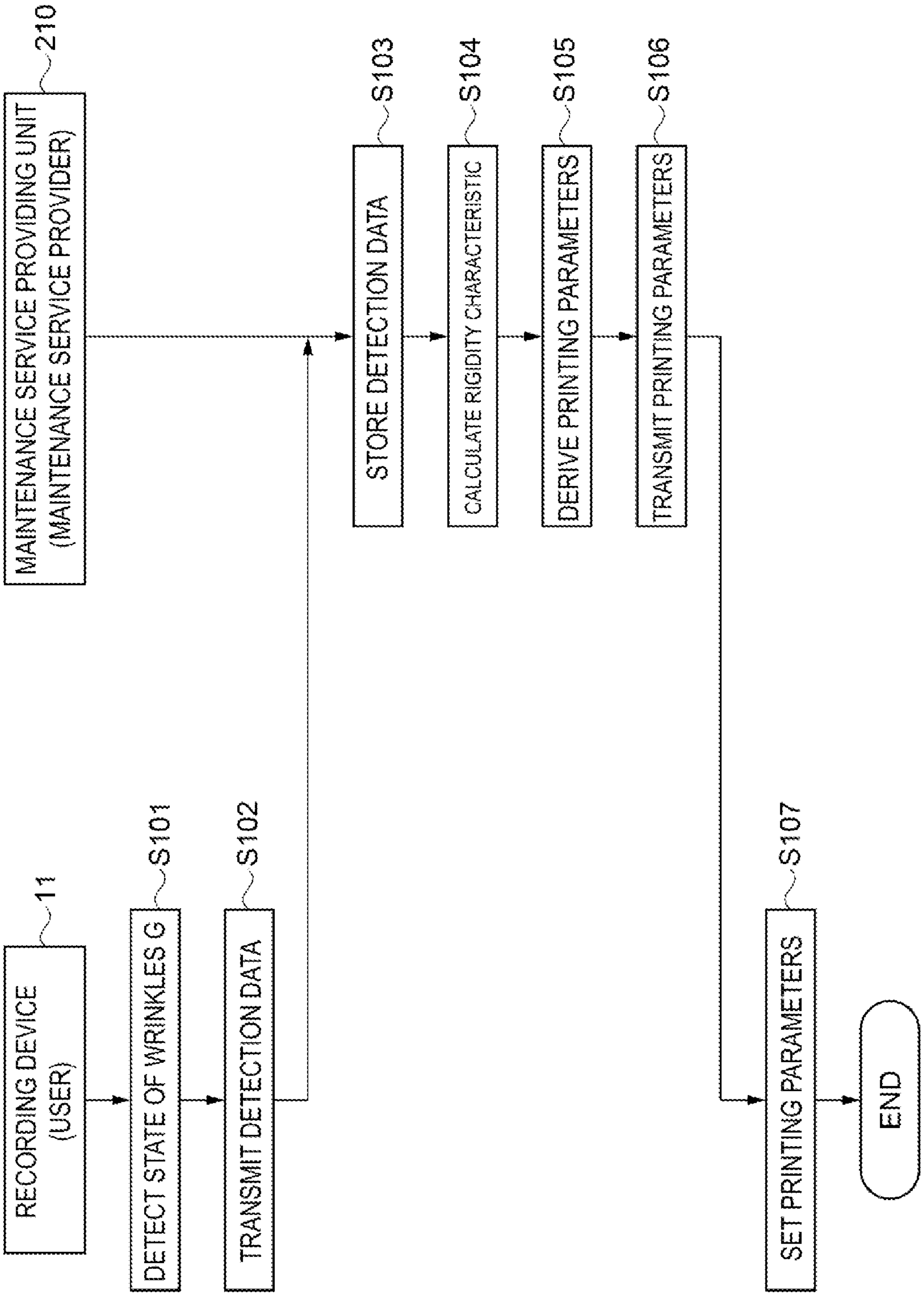
FIG. 15 is a flowchart illustrating a method for controlling the information processing system according to the third embodiment.

As illustrated in FIG. 15, first, in step S101, the control unit 100 of the recording device 11 forms the wrinkles G on a portion of the media M used in the recording by driving the wrinkle forming mechanism 30 before the recording is performed on the media M (see FIG. 2). Then, the control unit 100 drives the detection unit 40 to acquire the dimensional data such as the height dimension H and the width dimension W of the wrinkles G and the contact pressure data with respect to the wrinkles G (see FIG. 4 and FIG. 5).

Next, in step S102, the control unit 100 transmits the acquired detection data to the maintenance service providing unit 210.

In step S103, the second control unit 211 of the maintenance service providing unit 210 receives the transmitted detection data, and allows the memory to store the received detection data.

In step S104, the second control unit 211 calculates the rigidity characteristic based on the acquired detection data.

Next, in step S105, the second control unit 211 derives the printing parameters on the data table based on the calculated rigidity characteristic. A series of data such as the calculated rigidity characteristic and the derived printing parameters is stored in the memory and is compiled into the database.

Next, in step S106, the second control unit 211 transmits the printing parameters to the recording device 11.

In step S107, the control unit 100 of the recording device 11 receives the printing parameters.

Hereinafter, in the recording device 11, the set values of the respective driving units are changed based on the printing parameters. Then, after the printing parameters are set, the recording processing is executed.

As described above, according to the present embodiment, by transmitting the detection data detected on a recording device 11 side to the maintenance service providing unit 210, a user can easily obtain printing parameters suitable for the media M to be used by the user. Particularly, when the user newly uses a media M, man-hours are required for adjusting the transport condition and the like. However, by acquiring the printing parameters from the maintenance service providing unit 210, it is possible to reduce the man-hours required for adjusting the transport system of the recording device 11, and the like. Further, on a maintenance service providing unit 210 side, by timely providing optimal printing parameters corresponding to the user's situation, the degree of satisfaction of a user can be increased.

Further, in the recording device 11, a load on the control unit 100 due to execution of arithmetic processing and deriving processing can be omitted.

What is claimed is:

1. A recording device comprising:

a transport unit configured to transport a medium along a transport path;

a recording unit configured to perform recording on the medium transported;

a wrinkle forming mechanism configured to form a wrinkle at a portion of the medium on the transport path before recording is performed;

a detection unit configured to detect a state of the wrinkle;

a control unit configured to control the wrinkle forming mechanism to form the wrinkle under a prescribed condition and to calculate a rigidity characteristic of the medium based on detection data of the detection unit; and a storage unit in which a data table where a printing parameter is associated with the rigidity characteristic is stored, wherein the control unit is configured to derive the printing parameter corresponding to the calculated rigidity characteristic.

2. The recording device according to claim 1, wherein the detection unit includes a sensor configured to detect a dimension, and is configured to detect a height dimension of a portion where the wrinkle is formed.

3. The recording device according to claim 1, wherein the detection unit includes a sensor configured to detect a dimension, and is configured to detect a width dimension, in a prescribed direction of the medium, of a portion of the medium where the wrinkle is formed.

4. The recording device according to claim 1, wherein the detection unit includes a sensor configured to detect a contact pressure, and is configured to detect a contact pressure when the sensor is brought into contact with a top portion of the wrinkle.

5. The recording device according to claim 1, wherein the wrinkle forming mechanism is configured to form the wrinkle at a portion of the medium on the transport path by generating a difference in transport speed of the medium transported.

6. The recording device according to claim 1, wherein the wrinkle forming mechanism includes:

a support unit configured to support the medium in the transport path; and a suction mechanism configured to suction the medium supported by the support unit toward the support unit side, and the wrinkle forming mechanism is configured to form the wrinkle at a portion of the medium on the support unit by generating, by the suction mechanism, a difference in suction force applied to the medium.

7. An information processing system configured to achieve communication between a recording device and a maintenance service providing unit, wherein the recording device includes:

a transport unit configured to transport a medium along a transport path;

a recording unit configured to perform recording on the medium transported;

a wrinkle forming mechanism configured to form a wrinkle at a portion of the medium on the transport path;

a detection unit configured to detect a state of the portion of the medium where the wrinkle is formed;

a first communication unit configured to communicate with the maintenance service providing unit; and a first control unit, wherein the first control unit is configured to control the wrinkle forming mechanism to form the wrinkle under a prescribed condition and to transmit detection data detected by the detection unit to the maintenance service providing unit, the maintenance service providing unit includes:

a second communication unit configured to communicate with the recording device;

a storage unit in which a data table where a printing parameter is associated with a rigidity characteristic is stored; and a second control unit, and the second control unit is configured to calculate the rigidity characteristic of the medium based on the received detection data, to derive the printing parameter corresponding to the calculated rigidity characteristic, and to transmit the derived printing parameter to the recording device.

8. The recording device according to claim 1, wherein the wrinkle forming mechanism includes:

a pressuring roller configured to apply a pressure to the medium so that the medium contacts the transport unit, and the prescribed condition is that a rotational axis of the pressurizing roller is skewed with respect to the transport path by a prescribed amount.

9. The information processing system according to claim 7, wherein the wrinkle forming mechanism includes:

a pressuring roller configured to apply a pressure to the medium so that the medium contacts the transport unit, and the prescribed condition is that a rotational axis of the pressurizing roller is skewed with respect to the transport path by a prescribed amount.

* * * * *